US012069307B2

(12) United States Patent
Bordes et al.

(10) Patent No.: US 12,069,307 B2
(45) Date of Patent: Aug. 20, 2024

(54) HIGH LEVEL SYNTAX SIMPLIFIED VIDEO CODING TOOL SET FOR SMALL BLOCKS

(71) Applicant: InterDigital Madison Patent Holdings, SAS, Paris (FR)

(72) Inventors: Philippe Bordes, Laille (FR); Fabrice LeLeannec, Mouazé (FR); Franck Galpin, Thorigne-Fouillard (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 132 days.

(21) Appl. No.: 17/608,705

(22) PCT Filed: Apr. 29, 2020

(86) PCT No.: PCT/US2020/030347
§ 371 (c)(1),
(2) Date: Nov. 3, 2021

(87) PCT Pub. No.: WO2020/226954
PCT Pub. Date: Nov. 12, 2020

(65) Prior Publication Data
US 2023/0095684 A1    Mar. 30, 2023

(30) Foreign Application Priority Data

May 3, 2019    (EP) .................................... 19305566

(51) Int. Cl.
*H04N 19/70*    (2014.01)
*H04N 19/176*    (2014.01)
*H04N 19/46*    (2014.01)

(52) U.S. Cl.
CPC ........... *H04N 19/70* (2014.11); *H04N 19/176* (2014.11); *H04N 19/46* (2014.11)

(58) Field of Classification Search
None
See application file for complete search history.

(56) References Cited

U.S. PATENT DOCUMENTS

2012/0163452 A1\* 6/2012 Horowitz ............... H04N 19/44
375/E7.243
2015/0262404 A1\* 9/2015 Laude .................. H04N 19/124
375/240.12

(Continued)

FOREIGN PATENT DOCUMENTS

WO    WO-2020058594 A1 \*    3/2020    ............. H04N 19/11

OTHER PUBLICATIONS

Chen et al, "Algorithm Description of Joint Exploration Test Model 7 (JEM 7)", Joint Video Exploration Team (JVET) of ITU-T SG16 WP3 and ISO/IEC JTC 1/SC29/WG11, Document: JVET-G1001-v1, 7th Meeting, Torino, Italy, Jul. 13, 2017, 50 pages.

(Continued)

*Primary Examiner* — Reza Aghevli
(74) *Attorney, Agent, or Firm* — Smadar Gefen

(57) ABSTRACT

A coding tool set enablement scheme allows one or more coding tools to be used in the encoding or decoding of video data based on one or more characteristics related to the video. In one embodiment, some coding tools are enabled for block sizes below a particular threshold. In another embodiment, a group of coding tools are enabled based on one flag for blocks having a particular characteristic. In another embodiment, these flags are included in a bitstream with the video. In another embodiment, at least one of the flags are inferred to enable some coding tools.

16 Claims, 8 Drawing Sheets

(56) References Cited

U.S. PATENT DOCUMENTS

| | | | |
|---|---|---|---|
| 2020/0020134 A1* | 1/2020 | Tsukuba | H04N 19/159 |
| 2020/0221111 A1* | 7/2020 | Seregin | H04N 19/46 |
| 2020/0244990 A1* | 7/2020 | Bordes | H04N 19/583 |
| 2020/0252608 A1* | 8/2020 | Ramasubramonian | H04N 19/119 |
| 2021/0044799 A1* | 2/2021 | Luo | H04N 19/157 |
| 2021/0136371 A1* | 5/2021 | Galpin | H04N 19/139 |
| 2022/0094909 A1* | 3/2022 | Hannuksela | H04N 19/174 |

OTHER PUBLICATIONS

Interdigital Communications, Inc., "Enabling tools for small blocks in small pictures", Document JVET-O0447, oint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.

Bjontegaard, Gisle, "Calculation of Average PSNR Differences between RD-Curves", Document VCEG-M33, ITU—Telecommunications Standardization Sector, Study Group 16 Question 16, Video Coding Experts Group, Thirteenth Meeting: Austin, TX, USA Apr. 2-4, 2001, 4 pages.

Li, Jingya et al., "CE2-related: Combination test of JVET-N0196 and JVET-N0266 (test 2)", JVET-N0821, 14th Meeting: Geneva, CH, Mar. 19-27, 2019, 3 pages.

Li, Jingya et al., "CE2: Using the shorter-tap filter for 4×4 sized partitions (Test 2.4.6)", JVET-N0196, 14th Meeting: Geneva, CH, Mar. 19-27, 2019, 10 pages.

"High Efficiency Video Coding", Series H: Audiovisual and Multimedia Systems, Infrastructure of audiovisual services—Coding of Moving Video, H.265, ITU-T Telecommunication Standardization Sector of ITU, Apr. 2013, 317 pages.

Bross, et al., "Versatile Video Coding (Draft 4)", Joint Video Experts Team (JVET) of ITU-T SG 16 WP 3 and ISO/IEC JTC 1/SC 29/WG 11, Document JVET-M1001-v7, 13th Meeting: Marrakech, Morocco, Jan. 9, 2019, 300 pages.

* cited by examiner

HIGH LEVEL SYNTAX SIMPLIFIED VIDEO CODING TOOL SET FOR SMALL BLOCKS

CROSS-REFERENCE TO RELATED APPLICATIONS

This application is a U.S. national stage application filed under 35 U.S.C. 371 of International Application No. PCT/US2020/030347, filed Apr. 29, 2020 and published as WO 2020/226954, which is a non-provisional filing of, and claims priority to and the benefit of European Patent Application No. 19305566.2, filed May 3, 2019, the entire contents of each of which are incorporated herein by reference as if fully set-forth herein in their respective entirety, for all purposes.

TECHNICAL FIELD

At least one of the present embodiments generally relates to a method or an apparatus for video encoding or decoding.

BACKGROUND

To achieve high compression efficiency, image and video coding schemes usually employ prediction, including spatial and/or motion vector prediction, and transforms to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction. A number of coding tools can be used in the process of coding and decoding.

SUMMARY

Drawbacks and disadvantages of the prior art may be addressed by the general aspects described herein, which are directed to block shape adaptive intra prediction directions in encoding and decoding.

According to a first aspect, there is provided a method. The method comprises steps for enabling use of one or more coding tools for coding at least one video block in a bitstream based upon characteristics of the at least one video block; and, including in the bitstream information representative of use of the one or more coding tools for blocks having the characteristics; and, storing, conveying, or transmitting the bitstream.

According to a second aspect, there is provided a method. The method comprises steps for parsing a bitstream for information representative of use of the one or more coding tools for decoding video blocks; using the information to enable use of one or more coding tools for at least one video block in a bitstream; and decoding the bitstream.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
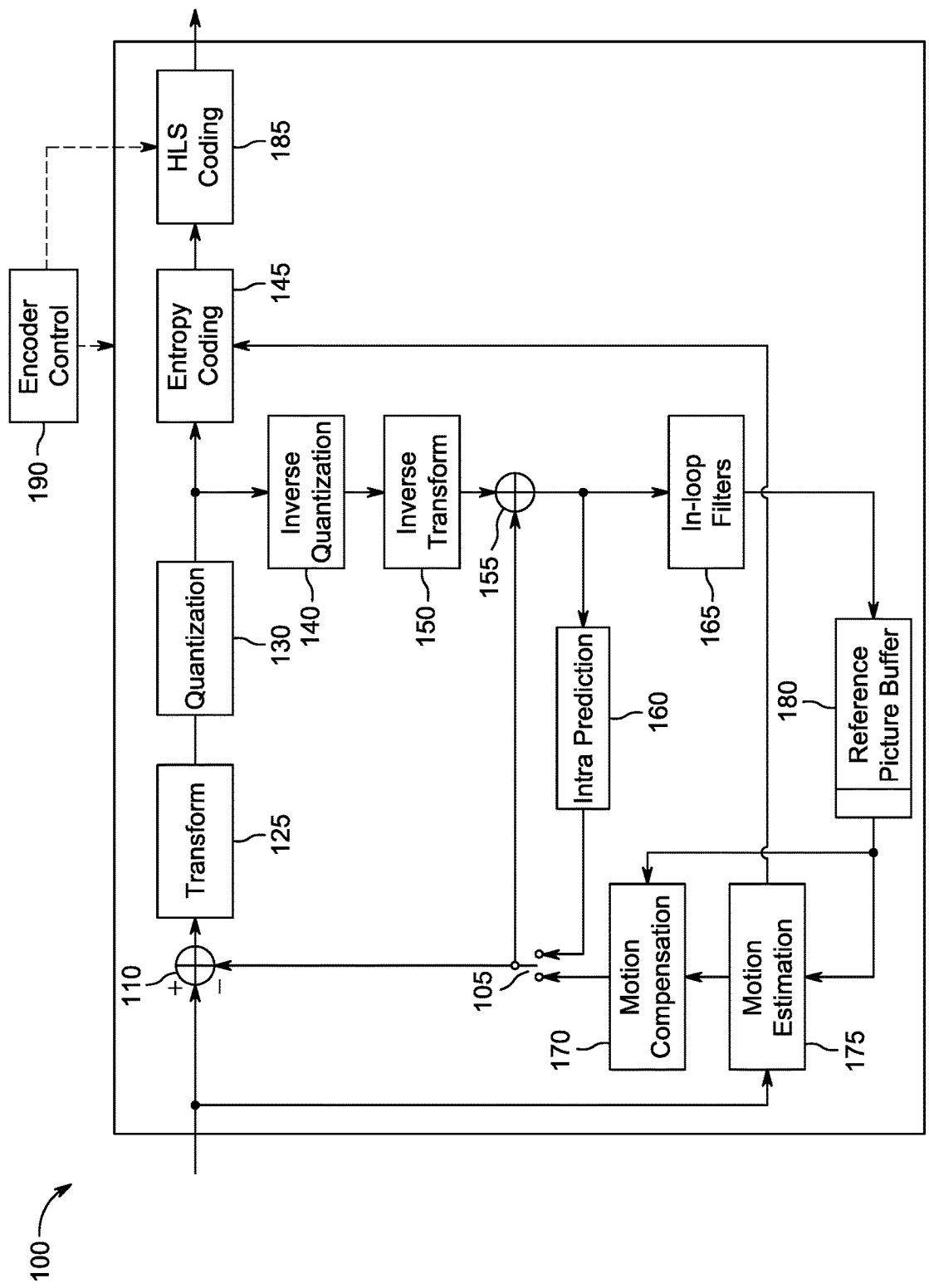
FIG. 1 shows a standard, generic video compression scheme

The invention is in the field of video compression and relate to video compression and video encoding and decoding. It aims at improving compression efficiency compared to existing video compression systems based on a hybrid architecture.

Versatile Video coding (VVC) test model (VTM) is a standardization effort for improving video compression. In VVC, any target block in intra prediction can have one of 67 prediction modes. In addition, there are a number of inter prediction modes and a number of coding tools that can be used.

In the current document, it will be mentioned a set of coding tools used in modern codecs:

Long-taps and short-taps motion compensation filters: the filter size used for motion compensation (MC) prediction may use filters with different number of taps.

Bi-prediction: two prediction blocks may be averaged to form one single prediction block.

Decoder-side motion vector refinement (a.k.a DMVR): in inter bi-prediction, the motion vectors may be refined using the samples of the two motion predictions by minimizing the difference.

Bi-Directional Optical Flow (a.k.a BDOF or BIO): BDOF allows adding offsets to the bi-prediction samples that are computed with the bi-optical flow equation.

Affine inter-prediction mode: the motion vector used for MC of the sub-blocks is function of the position of the sub-block in the block. This function is built as spatial linear interpolation of two or three reference motion vectors typically.

Local Illumination Compensation (LIC): the MC prediction may be corrected for local illumination change using simple model. The correction may be linear and the model parameters are derived from neighboring reconstructed and/or reference samples typically.

Affine linear weighted intra prediction (ALWP): some samples of the intra prediction block are derived as a linear weighting of neighboring (possibly filtered) reconstructed samples.

Triangle: non-rectangular prediction blocks (e.g. triangle) allows more flexibility for partitioning the picture into blocks.

Combined Inter and Intra prediction (a.k. CIIP): the general concept is to combine an inter prediction block with an intra prediction block. The inter prediction is performed in merge mode typically. The weighting may be fixed or may vary with the sample position in the block.

Generalized bi-prediction (a.k. GBI or BPWA or BWA): In case of inter bi-prediction, two predictions blocks are computed and combined with weighted sum. The weights to use are coded per CU with an index referring to pre-defined weights.

In hybrid video codecs, the coding efficiency is measured with BD-rate (Bjontegaard delta bitrate) gains typically. However, the tool complexity measured in number of operations and memory bandwidth is another important parameter to be considered, since it may impact the device manufacturing cost and the power consumption. When designing (e.g. standardization) or deploying the coding systems, one considers the trade-off between coding efficiency and tool complexity for each coding tool to be implemented in the codec.

However, for some coding tools, the trade-off between coding efficiency and tool complexity varies according to the block size. For example, for small blocks (e.g. 4×4), on one hand, the use of long-taps filters (e.g. 8-taps) for motion compensation or the bi-prediction, increases significantly the number of operations per sample compared to using shorter-taps filters (e.g. 6-taps) or uni-directional prediction. On the other hand, for large pictures (e.g. 2K or 4K), the 4×4 partitioning is rarely selected because larger block sizes have generally better trade-off, even if the exhaustive encoders must test numerous and costly (in term of number of operations) 4×4 block size configurations.

This is the reason why some codec design architects (e.g. standardization organization) have preferred to reduce the number of tools that implement 4×4 block size (ex: bi-prediction not supported for small blocks in VVC) or to simplify the tools supporting 4×4 block size (e.g. in a prior proposal, the 8-tap filters are replaced with 6-tap filters for 4×4 blocks).

The solutions proposed so far (hard choice of small block tools simplifications) consist in favoring some coding or architectures to the detriments of others. For example, VVC has chosen to favor the solutions with good complexity and gain trade-off for large picture sizes (e.g. 2K). If these choices have been motivated by the requirements of most applications which are based on large pictures, they negatively impact the lower image resolution use cases and jeopardize the versatility/adaptability of the final codec specification.

For example, another proposal is to:
- disable inter-prediction for 4×4 CU
- disable bi-prediction for 4×8 and 8×4 CUs
- use 6-tap interpolation filter for 4×4 CUs and sub-CUs motion compensation It is reported that the BD-rate losses of these simplifications increase while the picture size decreases as depicted in Table 1. Table 2 also confirms the BD-rate losses are correlated with the amount of 4×4 CUs in the bit-stream.

TABLE 1

BD-rate losses of combination of several 4 × 4, 4 × 8 and 8 × 4 tool simplifications.

| Picture size | Random Access Main 10 | | | | | Low delay B Main10 | | | | |
| --- | --- | --- | --- | --- | --- | --- | --- | --- | --- | --- |
| | Y | U | v | End | DecT | Y | U | V | End | DecT |
| 3840 × 2160 | 0.01% | 0.16% | 0.09% | 98% | 99% | | | | | |
| 3840 × 2160 | 0.14% | 0.16% | 0.28% | 98% | 99% | | | | | |
| 1920 × 1080 | 0.13% | 0.28% | 0.33% | 96% | 98% | 0.13% | 0.14% | 0.10% | 98% | 98% |
| 832 × 480 | 0.34% | 0.65% | 0.72% | 95% | 94% | 0.38% | 0.90% | 0.95% | 96% | 95% |
| 1280 × 720 | | | | | | 0.10% | −0.21% | 0.08% | 99% | 96% |
| Overall | 0.16% | 0.33% | 0.38% | 96% | 97% | 0.21% | 0.31% | 0.38% | 98% | 96% |
| 416 × 240 | 0.65% | 1.06% | 1.21% | 94% | 92% | 0.90% | 1.31% | 0.43% | 97% | 95% |
| 832 × 480 | 0.23% | 0.37% | 0.41% | 96% | 95% | 0.47% | 0.49% | 0.79% | 97% | 99% |

TABLE 2 ratio of 4 × 4 blocks and BD-rate losses when combining several 4 × 4, 4 × 8 and 8 × 4 tool simplifications for four 416 × 240 sequences.

| 416 × 240 | % of 4 × 4 CUs | Y | U | V |
| --- | --- | --- | --- | --- |
| BasketballPass | 7.29% | 0.27% | 0.78% | 0.85% |
| BQSquare | 20.0% | 1.15% | 1.50% | 1.79% |
| BlowingBubbles | 7.90% | 0.78% | 1.17% | 1.27% |
| RaceHorses | 6.80% | 0.38% | 0.81% | 0.92% |

The general aspects described herein propose High Level Syntax (HLS) and associated processes allowing control over the level of tools simplifications associated with small blocks and to better adapt the overall codec design to the particular application requirements and to various use cases.

Embodiment-1

A flag is defined and coded in the High-Level Syntax (HLS) indicating whether a set of coding tools are enabled (or disabled) for "small" blocks. This flag may be coded in SPS, PPS, slice or tile header for example (310).

An example of tools enabled/disabled for "small" blocks are (Table 3):

1. the use of long-taps filters (e.g. 8-taps) for motion compensation. In JVET software, small-taps filters are used for 4×4 blocks.
2. bi-prediction. In JVET software, inter-prediction is disabled for blocks sizes inferior to 4×8 and 8×4.
3. inter-prediction. In JVET software, inter-prediction is disabled for blocks 4×4.
4. Decoder-side motion vector refinement (a.k.a DMVR). In JVET software, DMVR is applied if number of block samples is at least equal to 64 and height at least equal to 8.
5. Bi-Directional Optical Flow (a.k.a BDOF or BIO). In JVET software, the BDOF is disabled for 4×4 and 4×8 blocks [enabled if !(pu.YQ.height==4|| (pu.YQ.width==4 && pu.Y( ).height==8))]
6. Affine inter-prediction mode. In JVET software, affine is enabled if width and height luminance block size are both strictly superior to 8. (warning merge>=8)
7. Local Illumination Compensation (LIC). In JVET software, LIC is disabled if number of block samples is inferior to 64.
8. Affine linear weighted intra prediction (ALWP). In JVET, ALWP is enabled whatever the luma block size. One could disable ALWP for small block
9. Prediction refinement with optical flow (a.k. PROF). One could disable PROF for small blocks.
10. Triangle. In JVET, Triangle is disabled if cu.lwidth( )*cu.lheight( )<TRIANGLE_MIN_SIZE=64
11. Combined Inter and Intra prediction (a.k. CIIP). In JVET software, triangle mode is disabled if number of samples is strictly inferior to 64.
12. Generalized bi-prediction (a.k. GBI or BPWA or BWA). In current JVET software, GBI is disabled if cu.lwidth( )*cu.lheight( )<256 only.

TABLE 3 summary of per tool "small" block categorization in JVET.

| | | Values below these are "small" blocks | | |
|---|---|---|---|---|
| | Tool | Num. luma samples | width | Height |
| 1 | Log-tap filters | 16 | | |
| 2 | Bi-prediction | 32 | | |
| 3 | Inter-prediction | 16 | | |
| 4 | DMVR | 64 | | 8 |
| 5 | BDOF | | 4 | 8 |
| 6 | Affine | | <8 | <8 |
| | Affine (Merge) | | <=8 | <=8 |
| 7 | LIC | 64 | | |
| 8 | ALWP | | | |
| 9 | PROF | | | |
| 10 | Triangle | 64 | | |
| 11 | CIIP | 64 | | |
| 12 | GBI (BPWA) | 256 | | |

The same flag groups a set of tools. Advantageously, the block is categorized as "small" using one or more pre-defined threshold values associated to the block size (330). For example, the block is categorized as "small" if the number of (luminance) samples (width×height) is below a threshold. In a variant, the block is categorized as "small" if both with and height are inferior to pre-determined thresholds widthMin and heightMin values, or if at least width or height is inferior to pre-determined threshold=sizeMin value.

In a variant, the thresholds may be defined per tool. This means the thresholds are different for "tool-i" and "tool-j". For example, for the tool-1 one may categorize as "small" blocks the ones with both width and height inferior to 4, whereas for tool-2 one may categorize as "small" blocks the ones with the number of samples below 32.

In a variant, if the CU (Coding Unit) is considered as "small" for "tool-i" (330), then the associated parameters (e.g. "mode_flag(i)") are not present in the stream and are inferred. For example, "mode_flag(i)" is inferred to be zero ("tool-i" does not apply). If the CU is considered as "not small", then the parameters associated to "tool-i" may be present in the bitstream if the other conditions for "tool-i" are fulfilled (340).

For example, in case of GBI (Generalized Bi-Prediction), if the CU is considered as "small" the syntax element "gbi_index" is not present in the bitstream and is inferred to be default. Else, if the CU is considered as "not small" and the CU is coded in "inter" and "merge" and "bi-prediction" modes (or, other conditions) then "gbi_index" is coded (340).

Embodiment-2

In a variant, the thresholds are function of the minimum size of a luma coding block minBlkSize (e.g. log 2_min_luma_coding_block_size_minus3 in HEVC) and/or the maximum luma coding block size (e.g. CTU size, log 2_diff_max_min_luma_coding_block_size in HEVC).

For example, the "small" blocks for tool-1 can be the blocks with less than minBlkSize×minBlkSize samples.

Then the thresholds are up-dated once the minimum or maximum block size has been decoded (320).

Embodiment-3

In a variant, one encodes directly in the HLS the value of the one or more thresholds.

Embodiment-4

Figure 4:
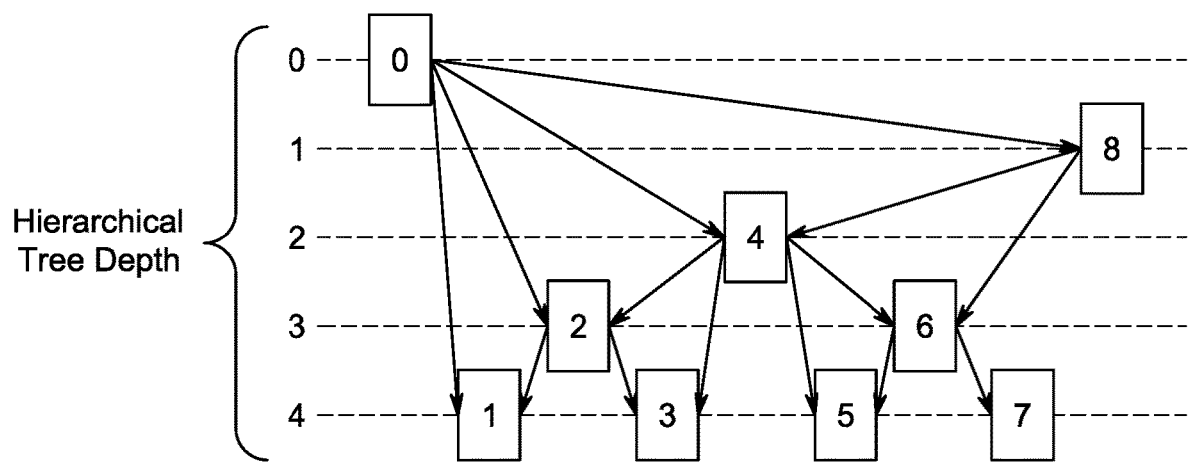
FIG. 4 shows an example of hierarchical picture coding depth.

In a variant, the flag value is not coded but inferred from one or several other parameter(s). For example, the flag is inferred from the picture size or the picture depth in case of hierarchical coding (FIG. 4). For example, the flag is inferred to be true (meaning the set of tools is enabled for "small" blocks) if the picture size (number of luminance samples) is inferior to a threshold=416×240. In another example, the flag is inferred to be true if both the picture size (number of luminance samples) is inferior to a threshold and the hierarchical depth of the current slice or tile (or tile group) is inferior to another threshold (e.g. th=3).

Embodiment-5

Depending on the profile/tier/level, the flag for small blocks might be forced to a pre-defined value for some profile/tier/level. It means that it is inferred, or it can be present in the bitstream, but its value is constraint by the profile and/or tier and/or level, as specified in the specification for example.

For example, for low level values, the value of the flag may be set to one (a set of coding tools are enabled for "small" blocks).

In a variant, the thresholds of emb-1 may be defined per profile, tier or level.

Figure 5:
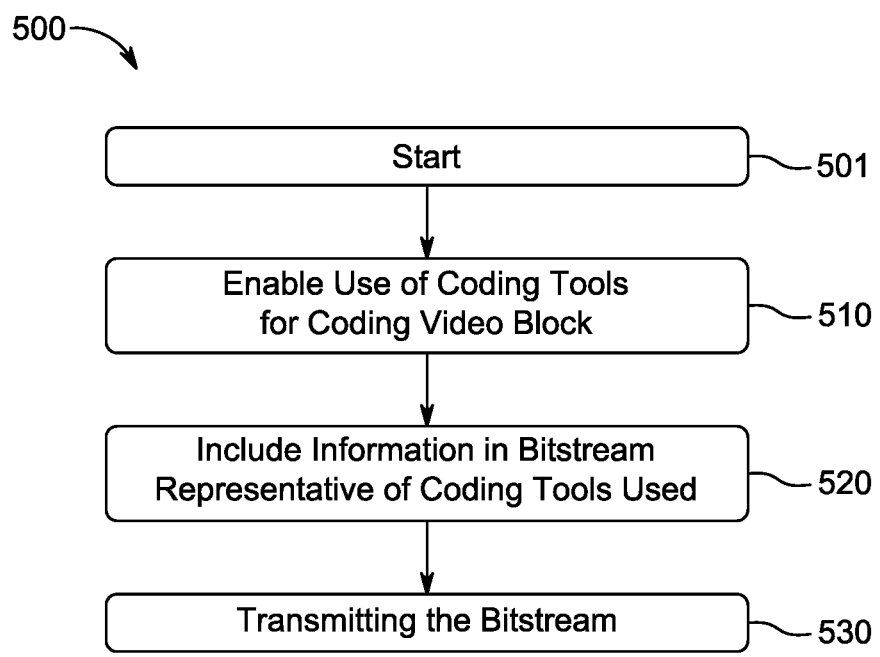
FIG. 5 shows one embodiment of an encoding method under the general aspects described.

One embodiment of a method 500 using the general aspects described here is shown in FIG. 5. The method commences at Start block 501 and control proceeds to function block 510 for enabling use of one or more coding tools for coding at least one video block in a bitstream based upon characteristics of the at least one video block. Control then proceeds from block 510 to block 520 for including in the bitstream information representative of use of said one or more coding tools for blocks having the characteristics. Control then proceeds from block 520 to block 530 for storing, conveying, or transmitting the bitstream.

Figure 6:
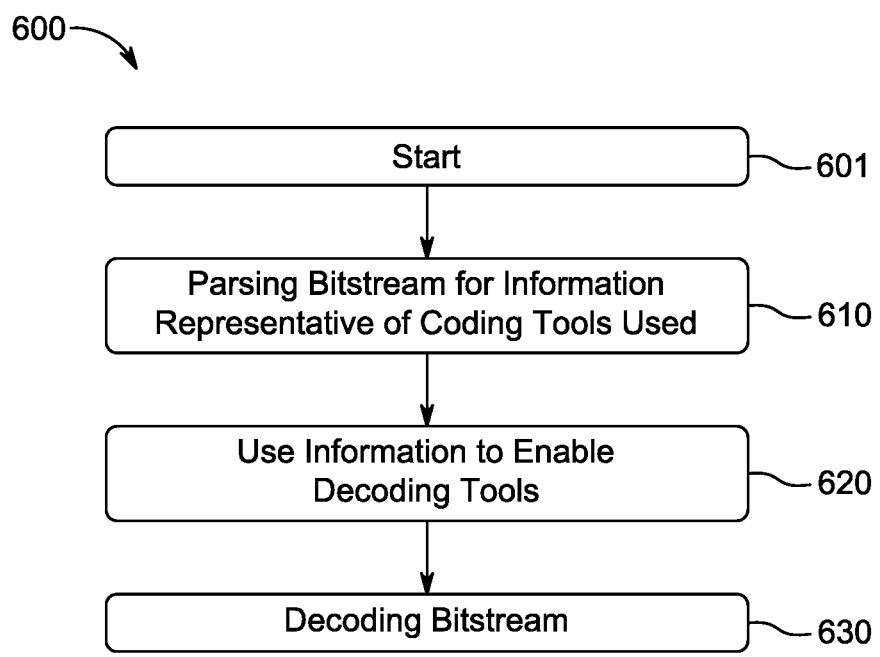
FIG. 6 shows one embodiment of a decoding method under the general aspects described.

One embodiment of a method 600 using the general aspects described here is shown in FIG. 6. The method commences at Start block 601 and control proceeds to function block 610 for parsing a bitstream for information representative of use of the one or more coding tools for decoding video blocks. Control then proceeds from block 610 to block 620 for using the information to enable use of one or more coding tools for at least one video block in a bitstream. Control then proceeds from block 620 to block 630 for decoding the bitstream.

Figure 7:
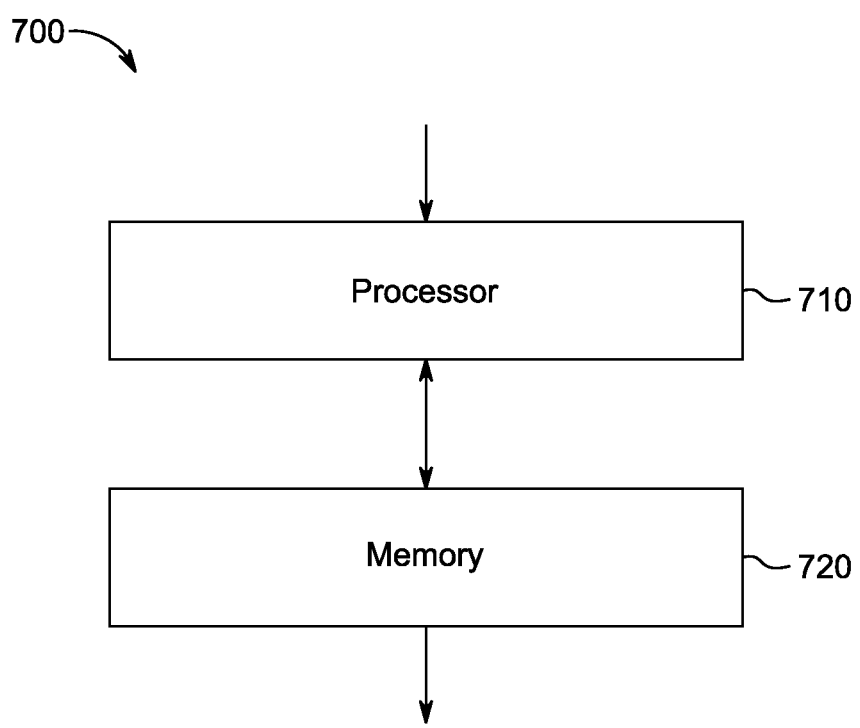
FIG. 7 shows one embodiment of an apparatus for encoding or decoding using intra prediction mode extensions.

FIG. 7 shows one embodiment of an apparatus 700 for compressing, encoding or decoding video using coding or decoding tools. The apparatus comprises Processor 710 and can be interconnected to a memory 720 through at least one port. Both Processor 710 and memory 720 can also have one or more additional interconnections to external connections.

Processor 710 is also configured to either insert or receive information in a bitstream and, either compressing, encoding or decoding using various coding tools.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 2:
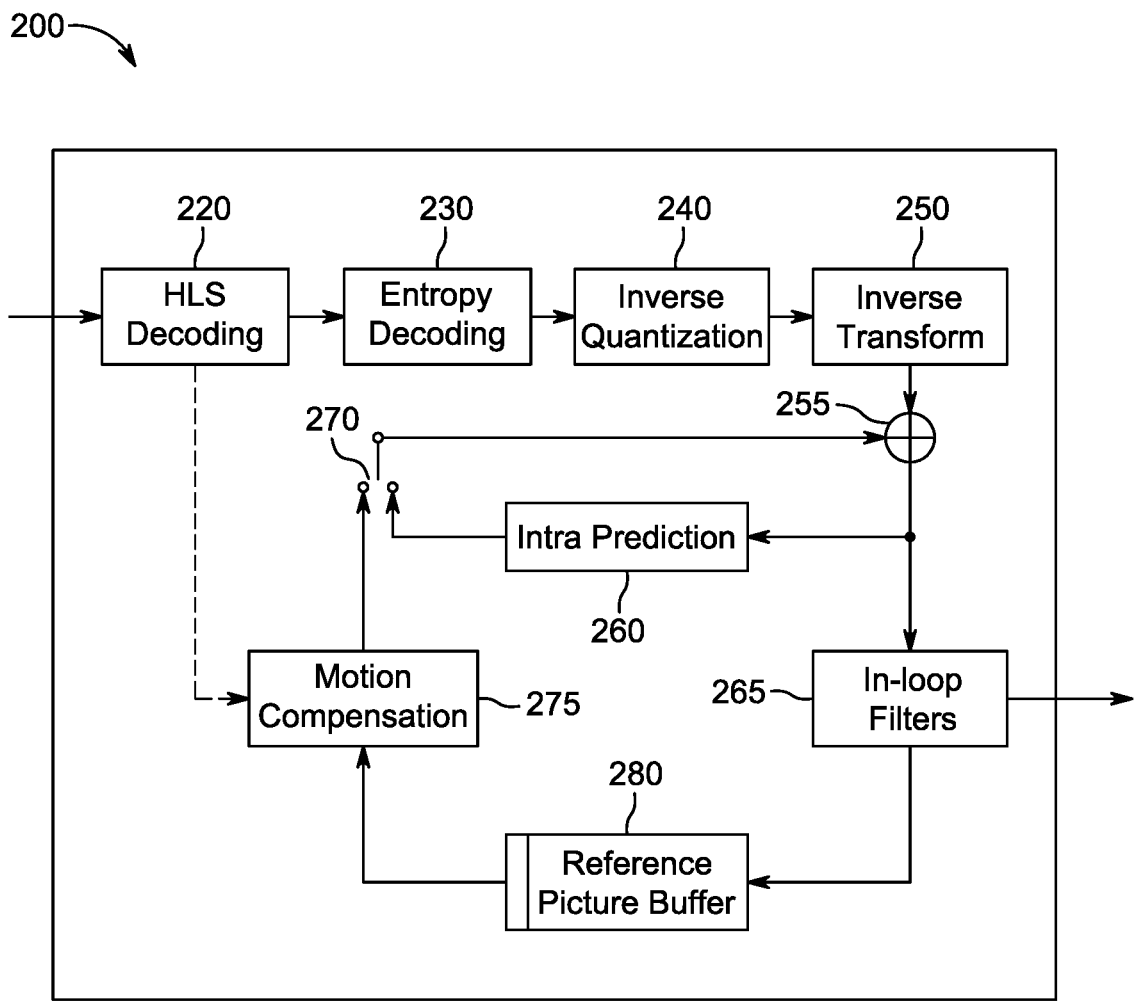
FIG. 2 shows a standard, generic, video compression scheme.
Figure 3:
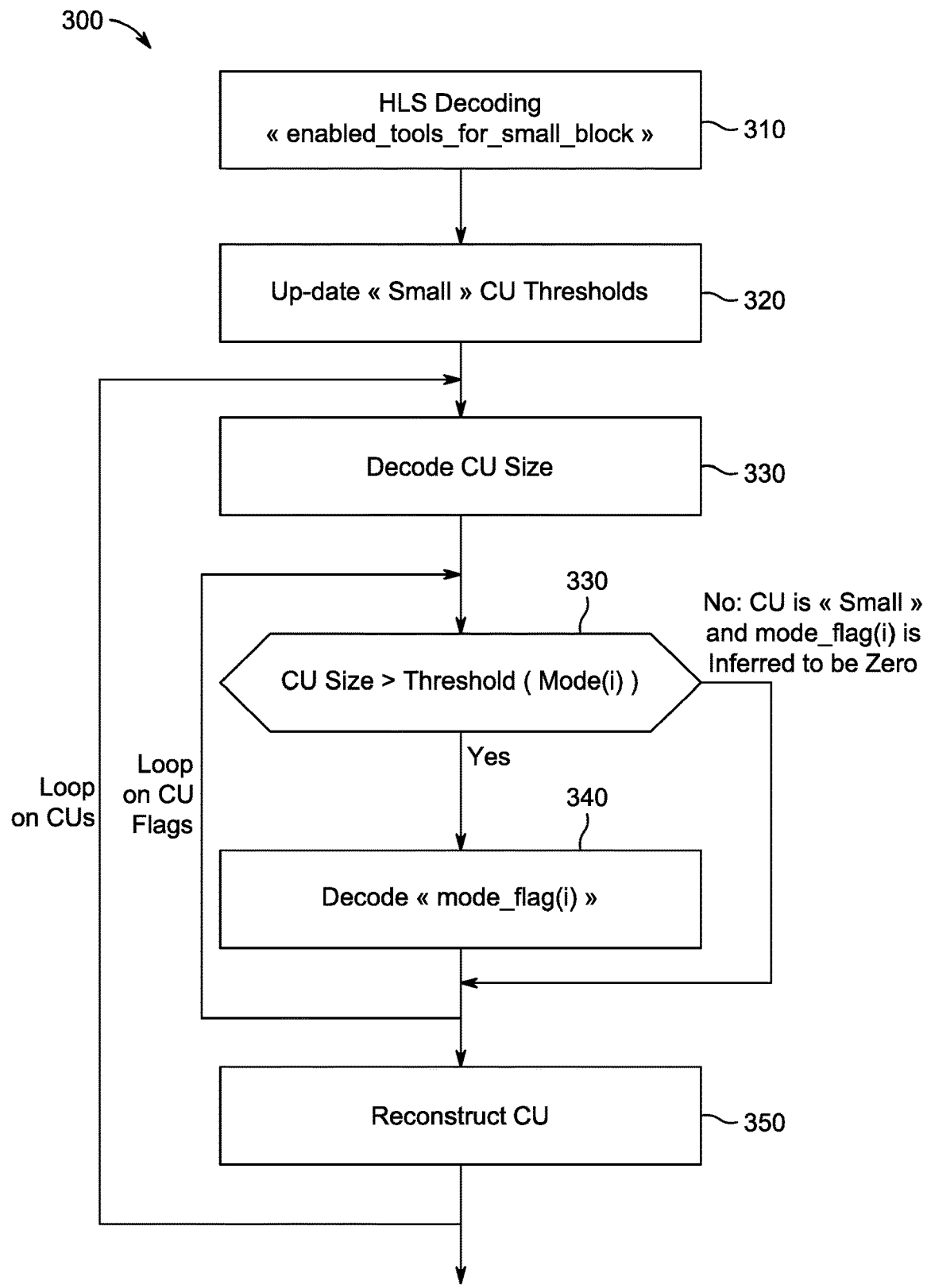
FIG. 3 shows an example flowchart of a hierarchical picture coding depth.
Figure 8:
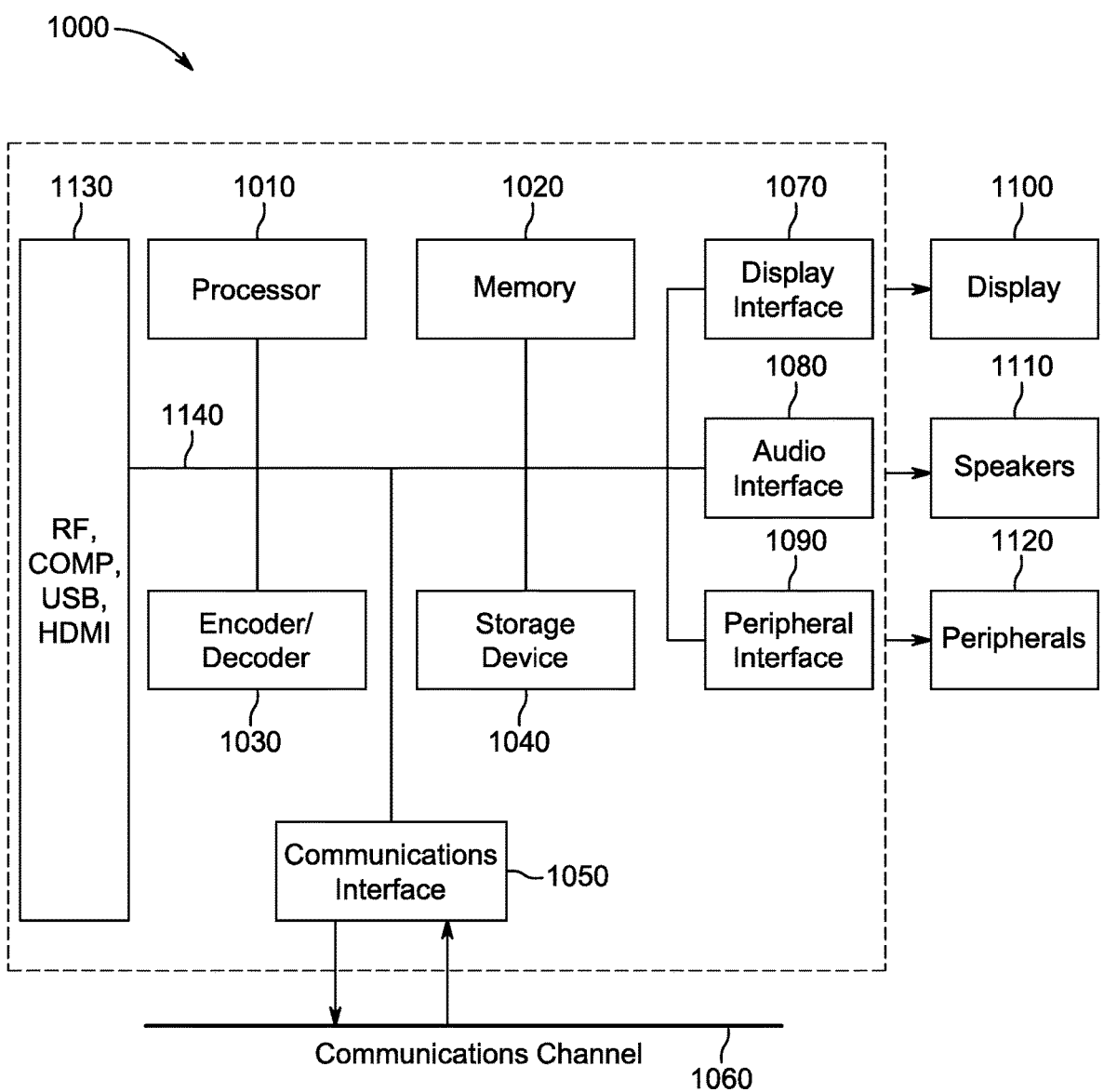
FIG. 8 shows a typical processor arrangement in which the described embodiments may be implemented.

The aspects described and contemplated in this application can be implemented in many different forms. FIGS. 1, 2, and 8 provide some embodiments, but other embodiments are contemplated and the discussion of FIGS. 1, 2, and 8 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 1 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 8 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 8, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

A process or device to convey information pertinent to perform encoding and decoding with one or more coding tools.

A process or device to convey information pertinent to perform encoding and decoding with inserted information in a bitstream representative of information to implement one or more coding tools.

A process or device to convey information pertinent to perform encoding and decoding with inserted information in a bitstream representative of information to implement one or more coding tools.

A bitstream or signal that includes one or more of the described syntax elements, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine coding mode in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

What is claimed is:

1. A method, comprising:
enabling use of a set of coding tools for coding at least one video block in a bitstream based on 1) two or more thresholds associated with a video block size of the at least one video block and 2) an indication indicating the set of coding tools being enabled, wherein each of the two or more thresholds associated with the video block size is used for a respective coding tool of the set of coding tools, and wherein the set of coding tools comprises one or more of: a motion compensation filter, an inter-prediction tool, an intra-prediction tool, a local illumination compensation tool, or a bi-prediction tool; and,
including in said bitstream information representative of use of the set of coding tools for blocks having the video block size; and,
storing, conveying, or transmitting said bitstream.

2. The method of claim 1, wherein said information is included as syntax in said bitstream.

3. The method of claim 1, wherein said information comprises at least one flag indicating at least one coding tool of the set of coding tools being enabled or disabled.

4. The method of claim 3, wherein the at least one flag controls enabling or disabling one or more coding tools of the set of coding tools.

5. The method of claim 1, wherein at least one threshold is a function of a minimum size or a maximum size of the at least one video block included in said bitstream.

6. A method, comprising:

parsing a bitstream for information representative of use of a set of coding tools for decoding video blocks;

using said information to enable use of the set of coding tools for at least one video block in a bitstream, wherein said information indicates the set of coding tools being enabled and two or more thresholds associated with a video block size of the at least one video block, wherein each of the two or more thresholds associated with the video block size is used for a respective coding tool of the set of coding tools, and wherein the set of coding tools comprises one or more of: a motion compensation filter, an inter-prediction tool, an intra-prediction tool, a local illumination compensation tool, or a bi-prediction tool; and decoding said bitstream.

7. The method of claim 6, wherein said information is included as syntax in said bitstream.

8. The method of claim 6, wherein said information comprises at least one flag indicating at least one coding tool of the set of coding tools being enabled or disabled.

9. The method of claim 8, wherein the at least one flag controls enabling or disabling one or more coding tools of the set of coding tools.

10. The method of claim 6, wherein at least one threshold is a function of a minimum size or a maximum size of the at least one video block included in said bitstream.

11. An apparatus, comprising:
a processor, configured to perform:

parsing a bitstream for information representative of use of a set of coding tools for decoding video blocks;

using said information to enable use of the set of coding tools for at least one video block in a bitstream, wherein said information indicates the set of coding tools being enabled and two or more thresholds associated with a video block size of the at least one video block, wherein each of the two or more thresholds associated with the video block size is used for a respective coding tool of the set of coding tools, and wherein the set of coding tools comprises one or more of: a motion compensation filter, an inter-prediction tool, an intra-prediction tool, a local illumination compensation tool, or a bi-prediction tool; and decoding said bitstream.

12. The apparatus of claim 11, wherein said information is included as syntax in said bitstream.

13. The apparatus of claim 11, wherein said information comprises at least one flag indicating at least one coding tool of the set of coding tools being enabled or disabled.

14. The apparatus of claim 13, wherein the at least one flag controls enabling or disabling one or more coding tools of the set of coding tools.

15. The apparatus of claim 11, wherein at least one threshold is a function of a minimum size or a maximum size of the at least one video block included in said bitstream.

16. A device comprising:

the apparatus according to claim 11; and at least one of (i) an antenna configured to receive a signal, the signal including the video block, (ii) a band limiter configured to limit the received signal to a band of frequencies that includes the video block, and (iii) a display configured to display an output representative of a video block.

* * * * *